Dec. 31, 1935.   E. W. SMITH   2,026,193

STORAGE BATTERY PLATE

Filed April 29, 1932

INVENTOR

Edward W. Smith

BY

Augustus B. Stoughton

ATTORNEY.

WITNESS:

Patented Dec. 31, 1935

2,026,193

UNITED STATES PATENT OFFICE 2,026,193

STORAGE BATTERY PLATE

Edward W. Smith, Philadelphia, Pa., assignor to The Electric Storage Battery Company, Philadelphia, Pa., a corporation of New Jersey Application April 29, 1932, Serial No. 608,250

1 Claim. (Cl. 136—43)

During the working or useful life of the plates of a storage battery (especially the positive plates in the case of the lead-acid type) the active material tends to become soft and to fall away from the grids. In order to retain it in position various forms of retainers have been devised and used, notably flat slotted rubber sheets held firmly against the surface of the positive plates, and slotted tubular retainers, which contain the active material.

The present invention has for its object an improvement upon both of the above:—First, in that the retainer is composed of material which is imperforate, but porous, the pores being microscopic, or even ultramicroscopic, so as to entirely prevent the passage of active material. Several methods are known of producing porous material answering to this description, most of them containing hard rubber as a constituent. Secondly, the retainer is made in the form of a block or slab, having cavities in which the active material with appropriate conductors, is held.

For a further exposition of my invention reference may be had to the annexed drawing and specification at the end whereof my invention will be specifically pointed out and claimed.

Figure 1:
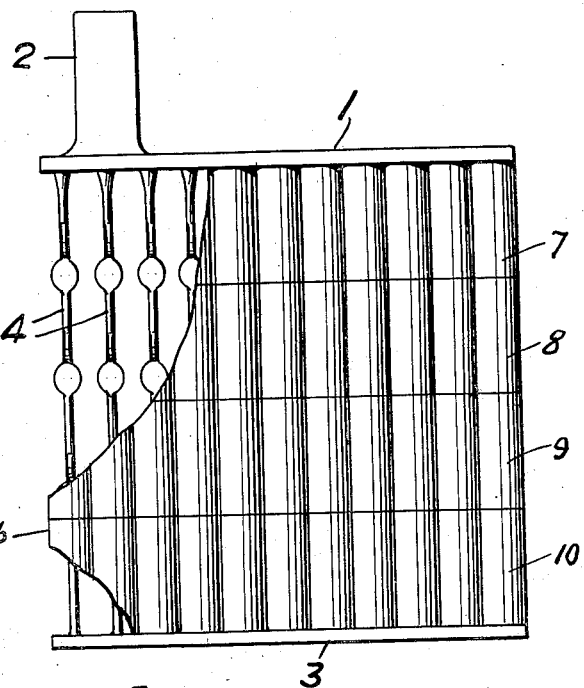
Figure 1 is a side elevation with parts broken away.
Figure 2:
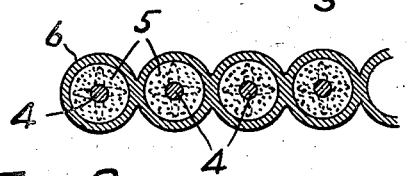
Figure 2 is a horizontal cross section.

Figure 1 shows, in elevation, and Figure 2 in cross-section, a plate made according to this invention, the same reference character denoting the same part in both cases. The metallic conductor consists of a top bar 1 with a main conducting lug 2 as an integral part of it, a bottom bar 3, and vertical conducting rods 4 extending between 1 and 3, the whole being made integral, as by an autogenous welding process, or by casting the bottom bar 3 in place upon the rods 4 after assembly and filling of the retainers.

Figure 4:
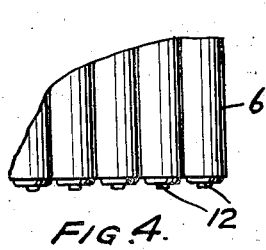
Figure 4 is a side elevation of a portion of another modification.

A modification is shown in Figure 4 by which a different method is employed for closing the cavities of the porous block at the bottom. Instead of the solid metallic bar above referred to, Figure 4 shows the lower ends of the cavities of the block closed by individual plugs 12, preferably of non-metallic material such as hard rubber. Such rubber plugs may be vulcanized in place and attached thereby firmly to the porous block, the metallic rods either stopping short of the plugs or projecting through them. Another alternative is to employ non-metallic material, such as hard rubber, for the bottom bar 3, as shown on Figure 1. An important advantage of either of these alternatives is that quite a saving in weight is thereby effected.

The retainer which surrounds the active material 5 and holds it in place, is represented by 6, and consists of a block or slab of the porous insulating material, having vertical cavities therein in which contain the active material 5, together with the conducting rods 4. The retaining block 6 may be made all in one piece for the whole plate, or it may, if more convenient, be divided into several sections 7, 8, 9 and 10, etc.; the horizontal cracks where two sections join being so narrow as to preclude the washing out of any active material to any detrimental extent.

Any one of several methods of manufacture may be used, as for instance:—The grid, consisting of the top frame 1 with the rods 4 cast integral thereto, may be inserted into the block 6; the whole thing then may be inverted, and powdered active material, either dry or wet, may be introduced until the cavities of the block become filled. The bottom bar 3 may then be attached either by welding a suitably shaped bar to the projecting ends of the rods 4 or by moulding such a bar directly in place, in such a manner as to secure a weld to each of the rods during the moulding.

While the cavities shown in the illustrations are of cylindrical shape, other shapes may be employed if preferred, and the invention is not limited to any particular shape either of the cavities or of the outside of the block.

Figure 3:
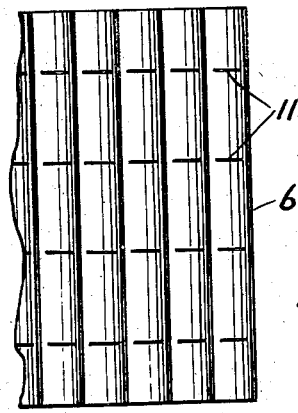
Figure 3 is a side elevation of a portion of a modification.

In certain cases, where insulating material of microporous nature is used, the pores are so minute as to prevent the passage of gas therethrough. To facilitate the egress of gas in such cases, it is desirable to provide at regular intervals openings of greater than microscopic size, such as the cracks between adjacent blocks 7, 8, etc., in Figure 1. Where a single block is used for the whole plate, minute openings or slots may be provided, at infrequent intervals for this same purpose, as shown at 11 in Figure 3.

The advantages of this invention are apparent when it is compared with existing types. It is common, for instance, to put a flat sheet of finely perforated hard rubber directly against the surfaces of the positive plate, such perforated sheets being held in place by means of ribbed wood separators. The ribs in this case bear against the perforated rubber sheet and hold it against the positive plate surface. In the working of the battery, however, the sheet of the perforated rubber always bulges outward between the ribs of the wood separator, thus permitting the active material to swell, loosen and finally fall away from the grid to the bottom of the cell. It is evident that where porous insulated material entirely surrounds the active material, it cannot thus bulge away from the active material; hence it is much more effective in retaining it in place.

It has been proposed to enclose the active material, as well as the grid, between sheets of perforated or porous insulating material, the sheets being attached to the grid to retain them in place. The junction between the metal of the grid and the non-metallic retaining sheet, however, is very difficult to maintain, and when such junction breaks down, the retaining sheet is no better than if placed loosely against the plate surface, and held in place by a grooved separator, as in the first instance above.

A further advantage results from the porous retainer being made in blocks, having a plurality of cavities, in regard to cost of manufacture, the relatively large blocks being cheaper to manufacture per se, and also cheaper in assembling and manufacturing into a plate, than a multitude of single cavity units. There are also various other advantages in this construction which will be obvious to those skilled in the art.

I do not intend to be limited in the practice of my invention save as the scope of the prior art and of the attached claim may require.

I claim:

A storage battery plate including in combination, a grid having a plurality of rods of conducting material; a plurality of pencils of active material, one of said pencils surrounding each of said rods; and a plurality of slabs of microporous, electrically insulating, acid resistant material, the pores of said material being so minute as to be indistinguishable even with a high powered microscope, and having a plurality of cavities therein each of which contains and completely encircles a longitudinal portion of a pencil of active material and of a conducting rod, the ends of said slabs being separated by cracks in communication with said active material and of sufficient magnitude to allow egress of gas and of insufficient magnitude to allow egress of active material.

EDWARD W. SMITH.